United States Patent [19]

Fancher

[11] 3,764,674

[45] Oct. 9, 1973

[54] PHOSPHONAMIDO THIAZOLES AND THEIR UTILITY AS INSECTICIDES

[75] Inventor: Llewellyn W. Fancher, Orinda, Calif.

[73] Assignee: Stauffer Chemical Company, New York, N.Y.

[22] Filed: Dec. 11, 1972

[21] Appl. No.: 313,702

Related U.S. Application Data

[62] Division of Ser. No. 198,012, Oct. 29, 1971, Pat. No. 3,723,450.

[52] U.S. Cl. ............................................... 424/200
[51] Int. Cl.............................................. A01n 9/36
[58] Field of Search .................................... 424/200

Primary Examiner—Albert T. Meyers
Assistant Examiner—D. W. Robinson
Attorney—Daniel C. Block et al.

[57] ABSTRACT

Compounds of the formula

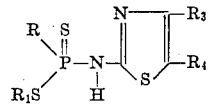

in which R is alkyl; $R_1$ is alkyl, alkenyl, alkynyl, benzyl, cyanoalkyl or alkylthio-alkylene; $R_3$ is hydrogen or alkyl; $R_4$ is hydrogen, alkyl or alkylthioalkylene are used as insecticides and acaricides.

35 Claims, No Drawings

PHOSPHONAMIDO THIAZOLES AND THEIR UTILITY AS INSECTICIDES

This is a continuation, division, of application Ser. No. 198,012, filed Oct. 29, 1971, now U.S. Pat. No. 3,723,450.

This invention relates to certain novel phosphorus-containing chemical compounds and their use as insecticides and acaricides. More particularly, the compounds are certain substituted 2-N-phosphonamido thiazoles.

The compounds of this invention that are useful as insecticides and acaricides are those having the formula

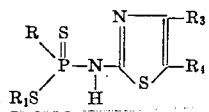

in which R is alkyl having one to four carbon atoms, inclusive; $R_1$ is alkyl having one to eight carbon atoms, inclusive, alkenyl having three to six carbon atoms, inclusive, preferably three carbon atoms, alkynyl having three to six carbon atoms, inclusive, preferably three carbon atoms, benzyl, cyano alkyl in which the alkyl group has one to four carbon atoms, inclusive, preferably one carbon atom, alkylthioalkylene having a total of two to six carbon atoms, preferably two carbon atoms; $R_3$ is hydrogen or alkyl having one to four carbon atoms, inclusive, preferably methyl; and $R_4$ is hydrogen, alkyl having one to four carbon atoms, inclusive, preferably methyl, or alkylthioalkylene having a total of from two to six carbon atoms, inclusive.

The compounds having the formula

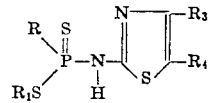

in which R, $R_1$, $R_2$, $R_3$ and $R_4$ are as defined above can be prepared by the following reactions:

(a)
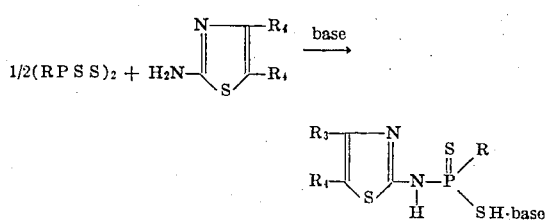

(b)
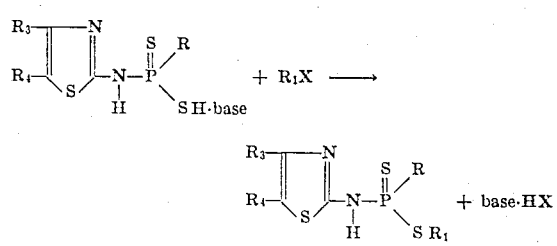

X represents a halogen such as chlorine, bromine or iodine.

The compounds of the instant invention can be prepared by the reactions depicted in the above equations. Selection of time, temperature and solvents can be made within wide limitations. Once the equations and reactants are known, the specific procedures can be varied and modified to accommodate and facilitate the reaction. The intermediate from equation (a), i.e., the phosphonamide salt, can be isolated or reacted in the same or different solvent, or the reaction can be carried through to completion without isolation.

To facilitate reaction (a), a non-reactive acid acceptor is used as a catalyst. In the following specific examples, triethylamine is used as the base, however, other non-reactive acid acceptors would be acceptable. Similarly, in reaction (b), it was found that the reaction can be promoted by a slightly basic medium. This can be accomplished by adding triethylamine as required.

The compounds of the present invention and their preparation are more particularly illustrated by the following examples. Following the examples is a table of compounds which are prepared according to the procedures described herein.

EXAMPLE I

Preparation of 2-(S-methyl ethyl phosphonamidodithioyl)-thiazole. Seven and four-tenths grams (7.4 g., 0.03 mole) of ethylthionophosphine sulfide was slurried in 100 ml. of dry dioxane and to this mixture was added 7.0 grams (0.07 mole) of 2-aminothiazole at 25°C. The temperature was allowed to increase to 30°. A white solid precipitated. The mixture was stirred and warmed at 45°–48° for 0.5 hours, cooled to 15° and 6.1 g. (0.06 mole) (8.4 ml.) of triethylamine was added followed by 9.9 g. (0.07 mole) (4.4 ml.) of methyl iodide. The mixture was stirred and warmed at 42°–48° for 1.5 hours. The dioxane was removed on a rotary evaporator and the residue dissolved in benzene and washed twice with dilute sodium chloride solution. The benzene solution, containing the product, was dried over anhydrous magnesium sulfate, filtered and the solvent removed on a rotary evaporator. There was obtained 15.1 g. of the title compound, a viscous liquid, $n_D^{30} = 1.6570$.

EXAMPLE II

Preparation of the Intermediate 2-(S-triethylammonium-ethyl phosphonamidodithioyl)-thiazole. Forty grams (40 g., 0.4 mole) of 2-aminothiazole was slurried in 200 ml. of benzene. To this slurry was added 81 g. (0.8 mole) (111 ml.) of triethylamine, followed by 52.1 g. (0.21 mole) of ethylthionophosphine sulfide with stirring. The temperature rose from 24° to 60°C. Stirring at ambient temperature was continued for 4 hours. The crystalline solid was filtered off and washed with diethyl ether and n-hexane. The product was filtered to remove the bulk of the solvent. The triethylamine salt still contained some solvent and weighed 140.1 g., m.p. 98°–104°C. This intermediate was used directly in the next step. Preparation of 2-(S-n-butyl, ethyl pohsphonamidodithioyl)-thiazole. Thirteen grams (13 g., 0.04 mole) of the triethylamine salt, supra, was mixed with 30 ml. of dimethyl formamide and 7.4 g. (0.04 mole) of n-butyl iodide was added. The mixture was tested and found to be slightly basic. The mixture was stirred at 55°–60°C. for 3 hours, then poured into water and extracted with benzene. The benzene phase was washed with water, dried over anhydrous magnesium sulfate, filtered, and evaporated on a rotary evaporator. There was obtained 10.0 g. (81.3 percent of theory) of the title compound, $n_D^{30} = 1.5932$.

The following is a table of certain selected compounds that are preparable according to the procedure described herein. Compound numbers are assigned to each compound and are used throughout the remainder of the application.

TABLE I

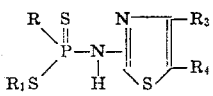

| Compound number | R | R₁ | R₃ | R₄ | M.P., °C. or $n_D^{30}$ |
|---|---|---|---|---|---|
| 1 | C₂H₅ | CH₃ | H | H | 1.6570 |
| 2 | C₂H₅ | C₂H₅ | H | H | 1.6262 |
| 3 | CH₃ | CH₃ | H | H | 92–95 |
| 4 | CH₃ | C₂H₅ | H | H | 1.6367 |
| 5 | C₂H₅ | n-C₃H₇ | H | H | 1.6199 |
| 6 | C₂H₅ | i-C₃H₇ | H | H | 1.6052 |
| 7 | C₂H₅ | CH₂=CHCH₂ | H | H | 1.6496 |
| 8 | C₂H₅ | CH≡CCH₂ | H | H | 1.6414 |
| 9 | C₂H₅ | CH₃(CH₂)₇ | H | H | 1.5564 |
| 10 | C₂H₅ | C₆H₅—CH₂ | H | H | 1.6343 |
| 11 | C₂H₅ | (CH₃)₂CHCH₂CH₂ | H | H | 1.5436 |
| 12 | C₂H₅ | (CH₃)₂CHCH₂ | H | H | 1.5613 |
| 13 | C₂H₅ | CH₃(CH₂)₃CH(CH₃) | H | H | 1.5507 |
| 14 | C₂H₅ | CH₃CH₂CH(CH₃) | H | H | 1.6010 |
| 15 | C₂H₅ | CH₃(CH₂)₅ | H | H | 1.5932 |
| 16 | C₂H₅ | (C₂H₅)₂CHCH₂ | | | |
| 17 | C₂H₅ | n-C₄H₉ | H | H | 1.6037 |
| 18 | C₂H₅ | NCCH₂ | H | H | 1.6390 |
| 19 | C₂H₅ | CH₃SCH₂ | H | H | 1.6516 |
| 20 | C₂H₅ | CH₃ | CH₃ | H | 1.6544 |
| 21 | C₂H₅ | CH₂CH=CH₂ | CH₃ | H | 1.6303 |
| 22 | C₂H₅ | CH₂C≡CH | CH₃ | H | 1.6446 |
| 23 | C₂H₅ | CH₃ | C₂H₅SCH₂ | H | 1.6395 |
| 24 | C₂H₅ | CH₃ | CH₃SCH₂ | H | 1.6608 |
| 25 | C₂H₅ | C₂H₅ | CH₃SCH₂ | H | 1.6327 |

Other examples of compounds falling within the generic formula presented herein, which are preparable by the aforedescribed procedures and which may be formulated into insecticidal and acaricidal compositions and applied as herein illustrated are:

| R | R₁ | R₃ | R₄ |
|---|---|---|---|
| C₂H₅ | CH₃ | CH₃ | CH₃ |
| CH₃ | CH₃ | CH₃ | CH₃ |
| C₂H₅ | CH₃SCH₂ | CH₃ | CH₃ |
| C₂H₅ | CH₂=CHCH₂ | CH₃ | CH₃ |

INSECTICIDAL EVALUATION TESTS

The term "insect" is used herein in its broad common usage to include spiders, mites, ticks and like pests which are not in the strict biological sense classified as insects. The term "insect" is used to refer not only to those small invertebrate animals belonging mostly to the class Insecta, comprising six-legged usually winged forms, as beetles, bugs, bees, flies, and so forth, but also to other allied classes of arthropods whose members are wingless and usually have more than six legs, as spiders, mites, ticks, centipedes, and wood lice.

The following insect species were used in evaluation tests for insecticidal activity:

1. Housefly (HF) — *Musca domestica* (Linn.)
2. Lygus Bug (LB) — *Lygus hesperus* (Knight)
3. Bean Aphid (BA) — *Aphis fabae* (Scop.)

The housefly (HF) was used in evaluation tests of selected compounds as insecticides by the following procedure. A stock solution containing 100 μg/ml. of the toxicant in an appropriate solvent was prepared. Aliquots of this solution were combined with 1 milliliter of an acetone-peanut oil solution in a glass Petri dish and allowed to dry. The aliquots were there to achieve desired toxicant concentration ranging from 100 μg/per Petri dish to that at which 50 percent mortality was attained. The Petri dishes were placed in a circular cardboard cage, closed on the bottom with cellophane and covered on top with cloth netting. Twenty-five female houseflies, three to five days old, were introduced into the cage and the per cent mortality was recorded after 48 hours. The LD-50 values are expressed in terms of μg. per 25 female flies. The results of this insecticidal evaluation test are given in Table II under "HF".

In the lygus bug (LG) *Lygus hesperus* test, 10 to 25 2-week old nymphs of lygus bug were placed in separate circular cardboard cages sealed on one end with cellophane and covered by a cloth netting on the other. Aliquots of the toxicants, dissolved in an appropriate solvent, were diluted in water containing 0.002 percent of a wetting agent, Sponto 221 (polyoxyether of alkylated phenols blended with organic sulfonates). Test concentrations ranged from 0.05 percent downward to that at which 50 percent mortality was obtained. Each of the aqueous suspensions of the candidate compounds were sprayed onto the insect through the cloth netting by means of a hand-spray gun. Per cent mortality in each case recorded after 24 and 72 hours counts were made to determine living and dead insects. The LD-50 values expressed as per cent of toxicant in the aqueous spray were calculated and recorded. These values are reported under the column "LB" in Table II.

The insect species black bean aphid (BA) *Aphis fabae* (Scop.) was also employed in the test for insecticidal activity. Young nasturtium (*Tropaeolum sp.*) plants, approximately 2 to 3 inches tall, were used as the host plants for the bean aphid. The host plant was infested with approximately 50–75 of the aphids. The test chemical was dissolved in acetone, added to water which contained a small amount of Sponto 221, an emulsifying agent. The solution was applied as a spray to the infested plants. Concentrations ranged from 0.05 per cent downward until an LD-50 value was achieved. These results are given in Table II under the column "BA".

ACARICIDAL EVALUATION TEST

The two-spotted mite (2SM), *Tetranychus urticae* (Koch), was employed in tests for miticides. Young pinto bean plants or lima bean plants (*Phaseolus sp.*) in the primary leaf stage were used as the host plants. The young pinto bean plants were infested with about 100 mites of various ages. Dispersions of candidate materials were prepared by dissolving 0.1 gram in 10 ml. of a suitable solvent, usually acetone. Aliquots of the toxicant solutions were suspended in water containing 0.002 percent v/v Sponto 221, polyoxyethylene ether sorbitan monolaurate, an emulsifying agent, the amount of water being sufficient to give concentrations of active ingredient ranging from 0.05 percent to that at which 50 percent mortality was obtained. The test suspensions were then sprayed on the infested plants to the point of run off. After 7 days, mortalities of the post-embryonic form was determined. The percentage of kill was determined by comparison with control plants which had not been sprayed with candidate compounds. The LD-50 value was calculated using well-known procedures. These values are reported under the columns "2SM-PE" and "2SM-Eggs," in Table II.

SYSTEMIC EVALUATION TEST

This test evaluates the root absorption and upward translocation of the candidate systemic compound. The bean aphid (BA) *Aphis fabae* (Scop.) and two-spotted mite (2SM) *Tetranychus urticae* (Koch), were employed in the test for systemic activity.

Young nasturtium (*Tropaeolum sp.*) plants were used as the host plants for the bean aphid. The host plants, 2-3 inches tall, were transplanted into one pound of soil that had been treated with the candidate compound. Immediately after planting in the treated soil, the plants were infested with 50-75 aphids of various ages. Concentrations of toxicant in the soil ranged from 10 ppm per pound of soil downward until an LD-50 value was obtained. Mortality was recorded after 72 hours.

The percentage of kill of the test species was determined by comparison with control plants placed in distilled water or untreated soil. The LD-50 values were calculated. These systemic test results are reported in Table II under the column "BA-Sys."

Aliquots of the toxicant dissolved in an appropriate solvent are diluted in water and placed in glass bottles. Pinto bean plants (Phaseolus sp.) with expanded primary leaves were placed in the solutions so that the roots and major portion of the stem were completely immersed. Immediately after placement of the plants, the leaves were infested with 75-100 mites of various ages. Total mortality of adults, nymphs and eggs were recorded after 1 week. The LD-50 values expressed in ppm of toxicant in the aqueous suspensions are reported in Table II under the column "2SM-Sys."

TABLE II.—(LD-50 VALUES)

| Compound number | HF, µg./25°+ | Percent | | BA-Sys. p.p.m. | 2 SM, percent | | 2 SM-Sys. p.p.m |
|---|---|---|---|---|---|---|---|
| | | LB | BA | | PE | Eggs | |
| 1 | 1.7 | .03 | .003 | 0.8 | .005 | .03 | .8 |
| 2 | 15 | >.05 | .003 | 1 | .03 | >.05 | >10 |
| 3 | 3 | .003 | .0008 | .3 | .003 | .008 | 1 |
| 4 | 16 | .03 | .003 | 3 | .008 | .03 | 3 |
| 5 | 30 | >.05 | .03 | 3 | .03 | .03 | 8 |
| 6 | 45 | >.05 | .03 | >10 | .03 | .03 | 5 |
| 7 | 10 | .05 | .003 | 1 | .01 | .03 | 1 |
| 8 | 4 | >.05 | .003 | 10 | .005 | .03 | .8 |
| 9 | >100 | — | >.05 | — | >.05 | >.05 | — |
| 10 | >100 | >.05 | .05 | >10 | .05 | >.05 | — |
| 11 | >100 | >.05 | .03 | — | <.05 | >.05 | — |
| 12 | >100 | >.05 | .03 | — | <.05 | <.05 | — |
| 13 | >100 | — | >.05 | — | >.05 | >.05 | — |
| 14 | 75 | >.05 | .03 | — | <.05 | <.05 | — |
| 15 | >100 | — | >.05 | — | .05 | .05 | — |
| 16 | >100 | | .003 | — | <.05 | <.05 | — |
| 17 | 90 | >.05 | .03 | — | <.05 | <.05 | — |
| 18 | 45 | .05 | >.05 | — | <.05 | <.05 | — |
| 19 | 30 | — | .003 | — | <.05 | <.05 | — |
| 20 | 25 | >.05 | .008 | 8 | .03 | >.05 | 3 |
| 21 | 45 | >.05 | .03 | 10 | >.05 | >.05 | 8 |
| 22 | 30 | .01 | .03 | — | .005 | .03 | .8 |
| 23 | >100 | — | >.05 | — | .03 | >.05 | — |
| 24 | >100 | >.05 | .03 | 3 | .03 | .03 | 3 |
| 25 | >100 | .05 | >.05 | — | >.05 | .05 | — |

NOTE. — indicates not tested for the indicated insect species.

As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cottonseed and so forth.

Liquid compositions are also useful and normally comprise a dispersion of the toxicant in a liquid media although it may be convenient to dissolve the toxicant directly in a solvent such as kerosene, fuel oil, xylene, alkylated naphthalenes or the like and use such organic solutions directly. However, the more common procedures is to employ dispersions of the toxicant in an aqueous medium and such compositions may be produced by forming a concentrated solution of the toxicant in a suitable organic solvent followed by dispersion in water, usually with the aid of surface active agents. The latter, which may be anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, fatty alcohol ethers, polyglycol fatty acid esters, and other polyoxyethylene surface active agents. The proportion of these agents commonly comprises 1-15 percent by weight of the pesticidal compositions although the proportion is not critical and may be varied to suit any particular situation.

What is claimed is:

1. The method of killing pests selected from the group consisting of insects and acarides comprising applying a pesticidally effective amount to the said pest or pest habitat of a compound having the formula

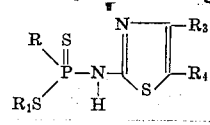

in which R is alkyl having one to four carbon atoms, inclusive; $R_1$ is alkyl having one to eight carbon atoms, inclusive, alkenyl having three to six carbon atoms, inclusive, benzyl, cyano alkyl in which the alkyl group has one to four carbon atoms, inclusive, or alkylthioalkylene having a total of two to six carbon atoms; $R_3$ is hydrogen or alkyl having one to four carbon atoms, inclusive; and $R_4$ is hydrogen, alkyl having one to four carbon atoms, inclusive, or alkylthioalkylene having a total of from two to six carbon atoms, inclusive.

2. A method according to claim 1 in which R is alkyl, $R_1$ is alkyl, $R_3$ is hydrogen and $R_4$ is hydrogen.

3. The method according to claim 2 in which R is ethyl and $R_1$ is methyl.

4. The method according to claim 2 in which R is ethyl and $R_1$ is ethyl.

5. The method according to claim 2 in which R is methyl and $R_1$ is methyl.

6. The method according to claim 2 in which R is methyl and $R_1$ is ethyl.

7. The method according to claim 2 in which R is ethyl and $R_1$ is n-propyl.

8. The method according to claim 2 in which R is ethyl and $R_1$ is isopropyl.

9. The method according to claim 2 in which R is ethyl and $R_1$ is n-octyl.

10. The method according to claim 2 in which R is ethyl and $R_1$ is 3-methylbutyl.

11. The method according to claim 2 in which R is ethyl and $R_1$ is isobutyl.

12. The method according to claim 2 in which R is ethyl and $R_1$ is 1-methylheptyl.

13. The method according to claim 2 in which R is ethyl and $R_1$ is n-hexyl.

14. The method according to claim 2 in which R is ethyl and $R_1$ is 2-ethylbutyl.

15. The method according to claim 2 in which R is ethyl and $R_1$ is n-butyl.

16. A method according to claim 1 in which R is alkyl, $R_1$ is benzyl, $R_3$ is hydrogen, and $R_4$ is hydrogen.

17. The method according to claim 16 in which R is ethyl.

18. A method according to claim 1 in which R is alkyl, $R_1$ is alkenyl, $R_3$ is hydrogen, and $R_4$ is hydrogen.

19. The method according to claim 18 in which R is ethyl and $R_1$ is 2-propenyl.

20. A method according to claim 1 in which R is alkyl, $R_1$ is alkynyl; $R_3$ is hydrogen; and $R_4$ is hydrogen.

21. The method according to claim 20 in which R is ethyl and $R_1$ is 2-propynyl.

22. A method according to claim 1 in which R is alkyl, $R_1$ is cyanoalkyl, $R_3$ is hydrogen and $R_4$ is hydrogen.

23. The method according to claim 22 in which R is ethyl, and $R_1$ is cyanomethyl.

24. A method according to claim 1 in which R is alkyl, $R_1$ is alkylene, $R_3$ is hydrogen and $R_4$ is hydrogen.

25. The method according to claim 24 in which R is ethyl and $R_1$ is methylthiomethylene.

26. A method according to claim 1 in which R is alkyl, $R_1$ is alkyl, $R_3$ is alkyl and $R_4$ is hydrogen.

27. The method according to claim 26 in which R is ethyl, $R_1$ is methyl and $R_3$ is methyl.

28. A method according to claim 1 in which R is alkyl, $R_1$ is alkenyl, $R_3$ is alkyl and $R_4$ is hydrogen.

29. The method according to claim 28 in which R is ethyl, $R_1$ is 2-propenyl and $R_3$ is methyl.

30. A method according to claim 1 in which R is alkyl, $R_1$ is alkynyl, $R_3$ is alkyl and $R_4$ is hydrogen.

31. The method according to claim 30 in which R is ethyl, $R_1$ is 2-propynyl and $R_3$ is methyl.

32. A method according to claim 1 in which R is alkyl, $R_1$ is alkyl, $R_3$ is alkylthioalkylene and $R_4$ is hydrogen.

33. The method according to claim 32 in which R is ethyl, $R_1$ is methyl and $R_3$ is ethylthiomethylene.

34. The method according to claim 32 in which R is ethyl, $R_1$ is methyl and $R_3$ is methylthiomethylene.

35. The method according to claim 32 in which R is ethyl, $R_1$ is ethyl and $R_3$ is methylthiomethylene.

* * * * *